US007198858B2

(12) United States Patent
Shipton et al.

(10) Patent No.: US 7,198,858 B2
(45) Date of Patent: Apr. 3, 2007

(54) METHOD OF VIBRATION DAMPING IN METALLIC ARTICLES

(75) Inventors: Mark H Shipton, Bristol (GB); Sophoclis Patsias, Stockport (GB)

(73) Assignee: Rolls-Royce PLC, London (GB)

( * ) Notice: Subject to any disclaimer, the term of this patent is extended or adjusted under 35 U.S.C. 154(b) by 512 days.

(21) Appl. No.: 10/689,053

(22) Filed: Oct. 21, 2003

(65) Prior Publication Data

US 2004/0096332 A1 May 20, 2004

(30) Foreign Application Priority Data

Nov. 15, 2002 (GB) ................................ 0226686.4

(51) Int. Cl.
*C03C 25/48* (2006.01)
*C03C 25/44* (2006.01)
*F04D 29/38* (2006.01)
*B64C 11/00* (2006.01)
*F01D 5/00* (2006.01)

(52) U.S. Cl. .............. 428/632; 416/241 R; 416/241 B; 427/454

(58) Field of Classification Search ................ 428/632, 428/623, 416; 416/241 B, 241 R
See application file for complete search history.

(56) References Cited

U.S. PATENT DOCUMENTS 3,758,233 A * 9/1973 Cross et al. ............ 416/229 R
4,405,284 A 9/1983 Albrecht et al.
6,127,048 A * 10/2000 Beele ......................... 428/623
6,218,029 B1 * 4/2001 Rickerby .................... 428/615
2002/0122718 A1 9/2002 Motherwell et al.

FOREIGN PATENT DOCUMENTS

| | | | |
|---|---|---|---|
| GB | 725503 | | 3/1955 |
| GB | 2 162 205 | A | 1/1986 |
| GB | 2 237 031 | A | 4/1991 |
| JP | A 70/48180 | | 8/1993 |

* cited by examiner

*Primary Examiner*—Jennifer McNeil
*Assistant Examiner*—Gordon R. Baldwin
(74) *Attorney, Agent, or Firm*—Oliff & Berridge, PLC

(57) ABSTRACT

A metal is used as a predominant component of an outermost metallic portion of a ceramic-containing and metal-containing vibration damping coating for a metallic article, for the purpose of enhancing resistance of the coating to foreign object damage and/or erosion while substantially maintaining or enhancing vibration damping performance of the coating.

The outermost metallic portion is preferably substantially free of non-metallic intrusions and cavities.

15 Claims, 2 Drawing Sheets

METHOD OF VIBRATION DAMPING IN METALLIC ARTICLES

The present invention relates to a method of damping vibration in metallic articles, to vibration-damped metallic articles formed or formable thereby, and to the use of a metal for achieving such vibration damping. More particularly, the invention relates to vibration damping of aerospace components such as gas turbine engine components.

The general use of ceramic coatings as vibration damping coatings for metallic articles such as gas turbine components is well known in the art.

U.S. Pat. No. 3,758,233 (Cross et al), the disclosure of which is incorporated herein by reference, discloses a metal alloy aero-engine rotor blade provided with a multilayer vibration damping coating consisting of an outermost portion formed of an oxide ceramic or refractory carbide and an intermediate portion formed of a mixture of a metal alloy and the oxide ceramic material. The intermediate portion can consist of two or more discrete layers, the layers having decreasing metal alloy content and increasing ceramic content towards the outermost layer portion.

Such an outermost ceramic layer typically has a relatively hard, rough, surface, which can give rise to aerodynamic frictional energy loss during operation of the blade. Furthermore, such coatings generally have rather low resistance to foreign object damage (FOD) and erosion.

U.S. Pat. No. 4,405,284 (Albrecht et al), the disclosure of which is incorporated herein by reference, discloses a thermal turbomachine casing having a multilayer heat insulation liner including a metallic bond coat in direct contact with the casing wall, a ceramic heat insulation layer bonded to the bond coat, and a porous, predominantly metallic, top layer bonded to the ceramic layer. The casing liner is stated to have the dual advantage of providing heat insulation to the casing while minimising wear suffered by a rotor caused by rubbing against the casing. However, there is no teaching or suggestion that the heat insulation casing liner would have any utility in preventing vibration in the casing. The term "porous" as used in this prior art appears to refer particularly to the presence of cavities in the top layer, enabling it to be eroded under normal operating conditions of the article. The prior art patent exemplifies a top layer including nickel and graphite constituents with cavities in the material.

The present invention is based on our surprising finding that, by providing an essentially metallic, and preferably substantially cavity-free, top layer on a ceramic-containing vibration damping coating for a metallic aerospace component, particularly but not exclusively a metallic aerospace component operating at substantially ambient temperature the vibration damping performance of the coating is maintained or enhanced, while going at least some way towards overcoming the problems associated with known ceramic vibration damping coatings.

According to a first aspect of the present invention, there is provided a method of damping vibration and enhancing resistance to foreign object damage and/or erosion of a metallic article, said method comprising applying to the article a vibration damping coating comprising ceramic and metallic components for the purpose of enhancing resistance of the coating to foreign object damage and/or erosion, thereby enhancing resistance of the article to foreign object damage and/or erosion; while substantially maintaining or enhancing vibration damping performance of the coating, thereby the substantially maintaining or enhancing vibration damping performance of the article; wherein a predominant component of an outermost portion of the coating is metallic; the ceramic vibration damping coating comprises a spinel; and the metallic article comprises a titanium alloy. The metallic outermost portion of the vibration damping coating is chosen from a list of materials comprising titanium alloy; steel alloys; nickel or an alloy or adduct consisting predominantly of nickel. The spinel is a magnesia-aluminia spinel. The outermost metallic portion of the coating is preferably substantially free of non-metallic intrusions or cavities.

According to a second aspect of the present invention, there is provided a vibration-damped metallic article embodying the method of the first aspect of the present invention.

In the following description, the part of the article beneath the vibration damping coating will be termed the metallic substrate.

The metal comprising the said outermost portion of the vibration damping coating may be the same as, or different from, the metal of the substrate. Most preferably, it will be the same as the metal of the substrate.

According to a third aspect of the present invention, there is provided a vibration-damped metallic article comprising a titanium alloy, said article comprising a vibration damping coating comprising ceramic and metallic components, wherein a predominant component of an outermost portion of the coating is metallic and is substantially free of non-metallic intrusions or cavities and the ceramic vibration damping coating comprises a spinel. The metallic outermost portion of the vibration damping coating is chosen from a list of materials comprising titanium alloy; steel alloys; nickel or an alloy or adduct consisting predominantly of nickel. The spinel is a magnesia-aluminia spinel.

In the vibration damping coating according to the present invention, a ceramic-containing component is sandwiched between two metallic parts, namely the substrate and the outermost portion of the coating. This is believed to potentially enhance the vibration damping effect of the ceramic layer, by constraining it during bending. Such constraint will give rise to a shear strain in the ceramic-containing component, and will result in the ceramic-containing component absorbing an unexpectedly large amount of vibrational energy from the system.

The term "substantially free of non-metallic intrusions or cavities" used herein means that the volume ratio of metallic component to the total of non-metallic components and voids (eg soft embedded non-metallic materials or air cells) at the outermost (surface) portion of the coating is such that the metallic component greatly predominates and the metallic component has a generally continuous internal structure. Typically, the volume ratio of metallic component to the total of non-metallic components and voids may be greater than about 15:1, more preferably greater than about 30:1.

The term "ceramic" used herein, as applied to a material of the coating, means that at least about 90% by weight of the material consists of a material having the physical properties normally associated with ceramics. Ceramics are chemical compounds typically composed of metal and non-metal elements in non-zero oxidation states linked by strong ionic bonds, and are typically characterised by a high shear strength which correlates to a high hardness (generally greater than 1000 Knoop) and a high compressive strength. A ceramic material is relatively brittle in comparison with a metal.

The terms "metallic" and "metal" used herein, as applied to a material of the coating, mean that at least about 90% by weight of the material consists of a material having the physical properties normally associated with metals. Metals usually consist of elements, or alloys, mixtures, adducts or complexes of elements, typically in the zero oxidation state and predominantly elements categorised as metals according to the Periodic Table of the Elements, and are typically characterised by a lower shear strength which correlates to a lower hardness value (less than 1000 Knoop) and a lower compressive strength. A metallic material is relatively ductile in comparison with a ceramic.

The metallic substrate may comprise any metal or metal alloy and is suitably of relatively low density, for example less than about 7 $gcm^{-3}$, less than about 6 $gcm^{-3}$ or less than about 5 $gcm^{-3}$. The metallic substrate suitably has a relatively high melting point or melting range. For example, the melting point or midpoint of the melting range may suitably be above about 1000° C., for example above about 1300° C., more preferably above about 1400° C., and most preferably above about 1500° C.

The metallic substrate may comprise a first metal as the main component and any other suitable metal or metals as a further component or components. It will be appreciated that the metallic substrate may also comprise semi- and non-metallic components in addition to metallic components. These semi- and non-metallic components may typically be present in lower amounts than the main metallic component, for example less than about 5% by weight, less than about 3% by weight or less than about 1% by weight.

The main component of the metallic substrate preferably comprises a transition metal or a transition metal alloy. The metallic substrate preferably comprises titanium, an alloy of titanium, steel or stainless steel. In a preferred embodiment, the metallic substrate comprises a titanium alloy substantially in the beta form.

In the case where the metallic substrate is a titanium alloy, it will comprise titanium as the main component and preferably one or more subsidiary components selected from the group consisting of aluminium, beryllium, bismuth, chromium, cobalt, gallium, hafnium, iron, manganese, molybdenum, niobium, nickel, oxygen, rhenium, tantalum, tin, tungsten, vanadium and zirconium. This alloy may also suitably comprise one or more semi- or non-metallic elements selected from the group consisting of boron, carbon, silicon., phosphorus, arsenic, selenium, antimony and tellurium. These elements may serve to increase the oxidation, creep or burning resistance of the metallic substrate.

Titanium may be present in such a titanium alloy in an amount greater than about 40% by weight, for example greater than about 50% by weight, greater than about 60% by weight or greater than about 70% by weight and in some embodiments may be present in an amount greater than about 80% by weight.

The amount in which the subsidiary component or components are present is determined by the use to which the metallic substrate will be put, as will be well understood by those skilled in this art. For example, the metallic substrate may be a ternary alloy comprising titanium, vanadium and chromium. Certain compositions of this type are especially preferred for certain applications wherein the titanium is present substantially in the beta form under most temperature conditions ie has less than about 3 wt % alpha phase titanium, preferably less than about 2 wt % alpha phase titanium. Such beta titanium alloys are based on ternary compositions of titanium-vanadium-chromium which occur in the titanium-vanadium-chromium phase diagram bounded by the points Ti-22V-13Cr, Ti-22V-36Cr, and Ti-40V-13Cr. These compositions are known to have useful mechanical properties such as high creep strength and a lack of combustibility at temperatures of up to at least about 650° C. In such compositions, the titanium is preferably present in an amount greater than about 40% by weight, for example greater than about 50% by weight. The chromium is preferably present in an amount greater than about 10% by weight, for example greater than about 15% by weight or greater than about 25% by weight. This concentration of chromium is necessary to provide the required non-burning characteristics of the alloy at these high temperatures. Vanadium may be present in an amount greater than about 20% by weight, for example greater than 25% by weight or greater than about 30% by weight. A specific alloy of this type has a composition comprising about 50 wt % titanium, about 35 wt % vanadium and about 15 wt % chromium.

In other applications, the elements of the alloy composition will be significantly different. For example, the metallic substrate may comprise titanium and other metals or semi-metals selected from the group consisting of aluminium, chromium, copper, iron, molybdenum, niobium, silicon, carbon, tin, vanadium and zirconium. In such alloys, aluminium is preferably present in an amount less than 10 wt %, for example less than 8 wt %; chromium is preferably present in an amount less than 10 wt %, for example less than 8 wt %; copper is preferably present in an amount less than 5 wt %, for example less than 3 wt %; iron is preferably present in an amount less than 5 wt %, for example less than 3wt %; molybdenum is preferably present in an amount less than 10 wwt %, for example less than 8 wt %; niobium is preferably present in an amount less than 6 wt %, for example less than 4 wt %; silicon is preferably present in an amount less than 2 wt %, for example less than 1 wt %; carbon is preferably present in an amount less than 1 wt %, for example less than 0.5 wt %; tin is preferably present in an amount less than 16 wt %, for example less than 12 wt %; vanadium is preferably present in an amount less than 15 wt %, for example less than 10 wt %; and zirconium is preferably present in an amount less than 8 wt %, for example less than 6 wt %. A specific example of such an alloy is Ti-6 Al-4V.

The vibration damping coating comprises ceramic and metallic components, which may be arranged in layers, in homogeneous admixture, in non-homogeneous admixture, or in any desired combination thereof, provided that the outermost portion of the coating is metallic.

The substrate-coating interface and any interfaces within the coating (eg layer-layer interfaces when the ceramic and metallic components are present in layers) may be diffuse or non-diffuse.

Diffuse interfaces of the coating may be graded, by which is meant herein that the relative proportions of ceramic and metal components may be varied across the interface. The variations may be continuous, ie without discrete boundaries between regions of different relative composition, or may be step-wise, ie with discrete boundaries between regions of different composition, or some of the variations may be gradual and some step-wise. Graded zones can comprise a minor or major proportion of the depth of the coating, in comparison with ungraded zones.

It is generally preferred that the coating consists essentially of the ceramic and metallic components, with less than about 10% by weight of other components and provided that any such other components that may be present do not alter the essential characteristics of the ceramic and metallic components.

It is particularly preferred that there is one predominantly ceramic region of the coating, disposed between the substrate and the outermost metallic portion. The interface between that predominantly ceramic region and the outermost metallic portion is preferably graded in a continuous manner.

In one embodiment of such a system, the interface between the predominantly ceramic region and the substrate may be discrete.

In another embodiment, a predominantly metallic region ("base layer" or "bond coat") of the coating may be disposed between the predominantly ceramic region and the substrate and in contact with the substrate. The interface between the predominantly ceramic region and the predominantly metallic region may be discrete or graded in a continuous manner. The predominantly metallic region may be the same as, or different from, the metal of the substrate. In one example, the predominantly metallic region between the predominantly ceramic region and the substrate may comprise a nickel-containing alloy or adduct such as nickel aluminide or a nickel-chromium alloy.

Any vibration damping ceramic component may be used in the coating. Such materials are well known in the art, and include, for example, refractory metal oxides and carbides, including spinel and other crystalline forms thereof.

The ceramic component is preferably a spinel. A spinel is a mixed metal oxide which has the general formula $AB_2O_4$, where A represents a divalent cation and B represents a trivalent cation. Examples of suitable divalent cations include $Fe^{2+}$, $Mg^{2+}$, $Cu^{2+}$ and $Mn^{2+}$. Examples of suitable trivalent cations include $Cr^{3+}$, $Fe^{3+}$, and $Al^{3+}$.

The crystalline structure of a spinel is typically characterised by a cubic system, in which the metal atoms exist in tetrahedral and octahedral coordination. In a so-called normal spinel structure, each A atom is coordinated with four oxygen atoms (ie in tetrahedral coordination), and each B atom is coordinated with six oxygen atoms (ie in octahedral coordination). In a so-called inversed spinel, the tetrahedral positions are occupied by some of the B atoms, whilst the A atoms and the remainder of the B atoms are distributed throughout the octahedral positions. All crystalline forms are embraced by the term "spinel" as used herein.

Spinel materials are characteristically ceramics. They are relatively inert to acid or base attack, and relatively refractory to heat.

The preferred spinel for use in the present invention is magnesia-alumina spinel, ie $A=Mg^{2+}$ and $B=Al^{3+}$. The term "magnesia-alumina spinel" used herein includes materials in which $MgAl_2O_4$ is the predominant component, ie comprising more than about 50% by weight of the material, and in particular does not exclude impure or mixed materials which can nevertheless fairly be described as a magnesia-alumina spinel.

Where more than one ceramic region exists in the coating, the ceramic materials used in each respective regions may be the same or different. In that case, however, it is preferred that the same ceramic material is used in all regions, for reasons of manufacturing simplicity.

The metallic component, particularly the component forming the outermost portion of the coating, is preferably selected from the metals and metal alloys mentioned above as potential materials from which the substrate may be formed, and any other relatively inert metal which provides an effective protective barrier for the ceramic component of the coating.

Such an other metal may comprise steel, eg stainless steel, nickel or an alloy or adduct consisting predominantly of nickel.

The material of the metallic component may the same as the material of the substrate, or the two may be different. It is preferred that the two materials are essentially the same.

Where more than one metallic region exists in the coating, the metallic materials used in each respective regions may be the same or different.

The article is preferably an aerospace component such as a fan, blade, vane, drum, casing or shroud portion of a gas turbine engine, or any part or fitting thereof.

The article may be used at ambient temperature or at an elevated temperature. The article according to the present invention will typically be used at ambient temperature or thereabouts, for example an air intake fan blade or other component located at the air intake end of a gas turbine engine, where a risk of foreign object damage and erosion is particularly acute.

The coating may be applied to the entire surface of the component, or to portions of the component such as those regions which encounter the largest vibrational forces.

The substrate may initially be prepared for coating in conventional manner, eg peening, degreasing and other surface treatments.

The coating may be applied by any convenient method for depositing metals, ceramics and metal/ceramic mixtures to metal substrates. The method should be capable of depositing at least the metal component in a substantially cavity-free manner.

Such deposition methods will be well known to those skilled in the art. Examples include: plasma spraying (eg air plasma spraying or vacuum plasma spraying), physical vapour deposition, chemical vapour deposition, high velocity oxyfuel deposition, sol-gel deposition and supersonic cold spray deposition.

The preferred deposition technique is air plasma spraying. In essence, a powder is entrained in a very high temperature plasma flame, where it is rapidly heated to a molten or softened state and accelerated to a high velocity. The hot material passes through a nozzle and impacts on the substrate surface, where it rapidly cools, forming the coating. It is preferred that a so-called "cold plasma spraying" process is used, whereby the temperature of the material impacting the substrate is maintained sufficiently low to avoid heat damage to the substrate.

The plasma spraying procedure is typically performed using a conventional plasma spraying apparatus comprising an anode (eg of copper) and a cathode (eg of tungsten), both of which are cooled (eg by water). Plasma gas (eg argon, nitrogen, hydrogen or helium) flows around the cathode and through the anode. The anode is formed into a constricting nozzle, through which the plasma stream and powder particles are ejected. The plasma is initiated by a high voltage discharge, which causes localised ionisation and a conductive path for a DC (direct current) electric arc to form between the cathode and the anode. The resistance heating from the arc causes the gas to reach extreme temperatures, dissociate and ionise to form a plasma. The plasma then exits the anode nozzle as a free or neutral plasma flame (ie plasma which does not carry any electric current).

The plasma spraying apparatus is normally located between about 25 and about 150 mm from the metallic substrate surface.

If a plasma spray process is used, the ceramic and metallic component materials are suitably fed from separate containers into the plasma flame, typically via an external powder port positioned close to the anode nozzle.

The ceramic and metal components or their precursors are typically supplied as separate powders for the plasma spraying deposition process, the rate of supply and the nature of the supplied materials being chosen according to the deposition procedure being employed, and the desired composition and structure of the coating.

The technique of plasma spraying mixtures of ceramic and metal powders onto a metallic substrate is described, for example, in U.S. Pat. No. 4,481,237, the disclosure of which is incorporated herein by reference.

For use in the preferred process of the present invention, the deposition apparatus must further incorporate standard feed and feed-rate control systems, whereby the relative proportions of the ceramic and the metal powders are appropriately adjusted according to the region of the coating being deposited. For example, the proportions of each powder fed into the spray may be controlled by a conventional control mechanism such that the composition of the coating changes in composition as the coating is built up from the substrate. It is most preferred that the compositional changes are gradual, so that no clearly defined compositional interface exists within the coating structure.

The method of applying the coating to the substrate may comprise an initial step of applying a metallic base layer or bond coat on the substrate. The coating is subsequently built up on the base layer, eg by way of a gradual change from above about 90% w/w, more particularly about 100% w/w, base layer metal to above about 90% w/w, more particularly about 100% w/w, ceramic at a central zone of the coating, and then a gradual change from above about 90% w/w, more particularly about 100% w/w, ceramic at the central zone to above about 90% w/w, more particularly about 100% w/w, metal (most preferably the substrate metal) at the outermost portion of the coating.

Alternatively, however, the base layer can be dispensed with, and the initial step could be applying the ceramic to the substrate, preferably forming a discrete, non-diffuse substrate-coating interface. The coating is subsequently built up on the substrate, preferably by way of a gradual change from above about 90% w/w, more particularly about 100% w/w. ceramic at the interface with the substrate to above about 90% w/w, more particularly about 100% w/w, metal (most preferably the substrate metal) at the outermost portion of the coating.

For a better understanding of the present invention, and to show more clearly how it may be carried into effect, reference will now be made, by way of example, to the accompanying drawings, in which.

Figure 1:
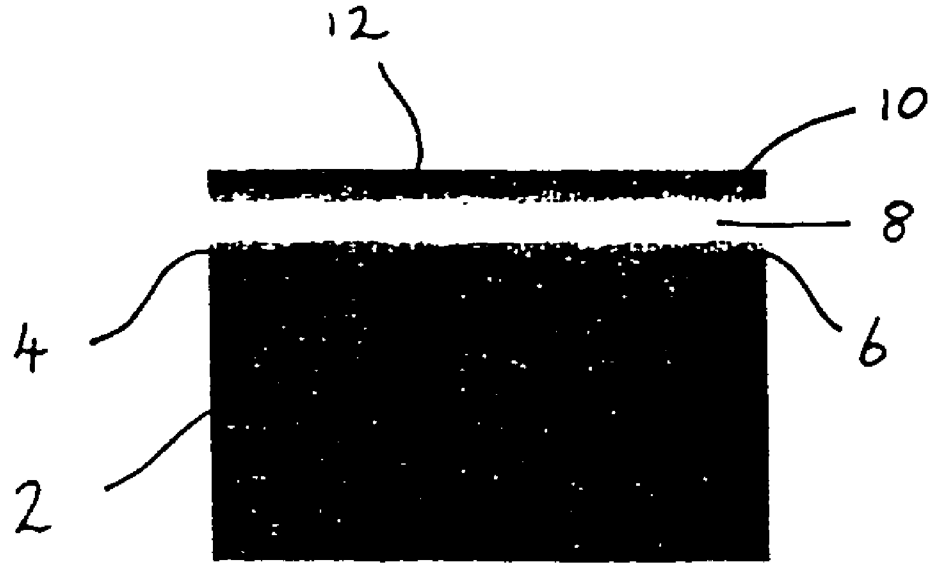
FIG.1 is a partial vertical sectional view of a substrate provided with a first vibration damping coating.

With reference to FIG. 1, a metallic substrate 2 is shown having a surface 4. On this surface 4 is provided a multilayer vibration damping coating consisting of, in order going outwards from the substrate, a metallic base layer 6, a ceramic vibration damping layer 8, and a metallic outermost layer 10 terminating in an outer surface 12 of the coating.

In this example, the base layer 6 consists of a nickel-containing metallic material and the outermost layer 10 and the substrate 2 consist of a titanium alloy, eg Ti-6Al-4V, and the ceramic vibration damping layer 8 consists of magnesia-alumina spinel.

The interfaces between the layers 6 and 8 and the layers 8 and 10 are graded in a continuous and preferably even manner, as shown by the shading.

The interface between the substrate 2 and the layer 6 is contiguous, without a sharply defined boundary, as a result of the materials of the layers being the same, and the lower solid line in FIG. 1, depicting the surface 4 of the substrate, is therefore to be considered as a purely illustrative tool and does not imply any defined boundary at the interface between the substrate and the coating.

Figure 2:
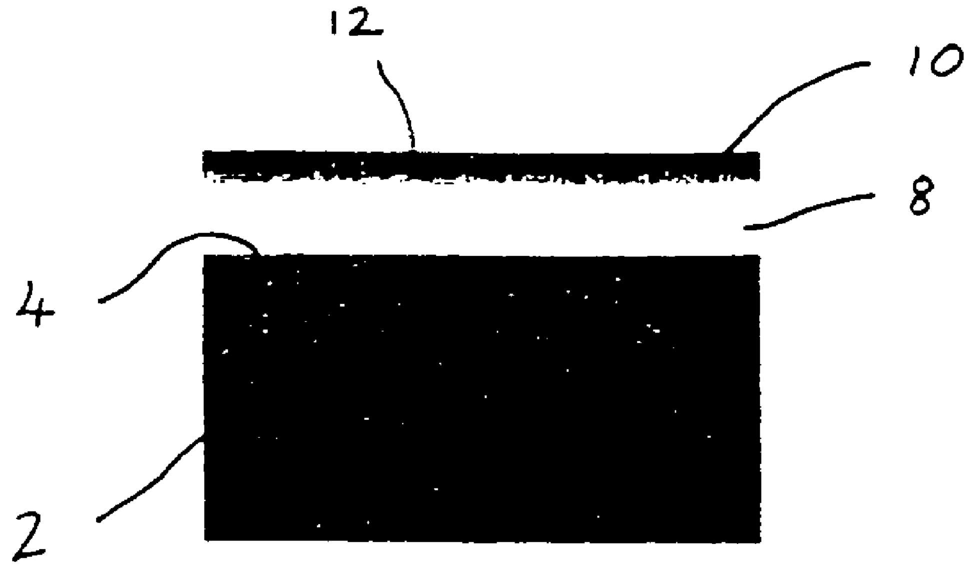
FIG. 2 is a partial vertical sectional view of a substrate provided with a second vibration damping coating.

Referring now to FIG. 2, in which like parts are designated alike, a second embodiment is shown, omitting the base layer 6. In this embodiment, the ceramic layer 8 is deposited directly onto the surface 4 of the substrate 2, resulting in a defined boundary where the metal of the substrate ends and the ceramic material of layer 8 begins. This boundary is depicted by the lower solid line in FIG. 2.

In each of FIGS. 1 and 2, an upper solid line also depicts the boundary between the outermost portion of the coating and the air at the surface 12 of the coating. Again, this solid line is purely to illustrate the position of the surface 12, to prevent confusion between the white area used to depict layer 8 and the white background of the Figures.

The coating of each embodiment is suitably formed on the substrate 2 by an air plasma spraying process (not illustrated). The substrate to be coated is placed in a chamber where a plasma is induced via a high frequency starter. Current is passed from the ionised gas, heating the gas to a high temperature. A powder of the material to be sprayed onto the component is injected into the expanding gas stream. The temperature of the gas melts the powder and this is propelled to the component and deposited on its surface.

To create the coating, titanium alloy powder and magnesia-alumina spinel powder and, where present, base layer powder, are fed from separate storage hoppers into the plasma spray via conventional feed lines under a conventional feed control mechanism. The control mechanism adjusts the proportions of each powder in the spray.

In the example illustrated in FIG. 1, only the base layer powder is initially fed into the plasma spray and is deposited directly onto the substrate 2. Gradually, by adjustment of the feed control mechanism, the proportion of magnesia-alumina spinel powder entering the spray is increased, and the base layer powder correspondingly decreased, as the plasma deposition of the coating continues, until no base layer powder is present in the spray. By this means, a continuously graded interface between layers 6 and 8 is produced. At this point, the adjustment of the feed control mechanism is stopped and a substantially pure magnesia-alumina spinel zone is deposited, forming a central region of the vibration damping ceramic layer 8. The deposition of substantially pure magnesia-alumina spinel is continued for as long as required.

After sufficient ceramic has been deposited, the control mechanism is then actuated, to gradually introduce more and more titanium alloy powder into the spray, with corresponding reduction in the proportion of the magnesia-alumina spinel powder in the feed, as the plasma deposition of the coating continues, until no ceramic powder is present in the spray. By this means, a continuously graded interface between layers 8 and 10 is produced. At this point, the adjustment of the feed control mechanism is stopped and a substantially pure metallic zone is deposited, forming the outermost portion of the coating and defining the surface 12 of the coating.

In the example illustrated in FIG. 2, only the magnesia-alumina spinel powder is initially fed into the plasma spray and is deposited directly onto the substrate 2. The deposition of substantially pure magnesia-alumina spinel is continued for as long as required. Thereafter, by adjustment of the feed control mechanism, the proportion of titanium alloy powder entering the spray is gradually increased, and the ceramic powder correspondingly decreased, as the plasma deposition of the coating continues, until no ceramic powder is present in the spray. By this means, a continuously graded interface between layers 8 and 10 is produced. At this point, the adjustment of the feed control mechanism is stopped and a substantially pure metallic zone is deposited, forming the outermost portion of the coating and defining the surface 12 of the coating.

The metallic outermost layer of the vibration damping coating preferably should be about 40 μm to about 300 μm thick and the ceramic containing vibration damping layer should be about 100 μm to about 800 μm thick. The thicker the coating the greater the possibility that the residual stress present in the coating will cause the coating to crack and become detached from the substrate. The thinner the coating the less damping will be provided.

Figure 3:
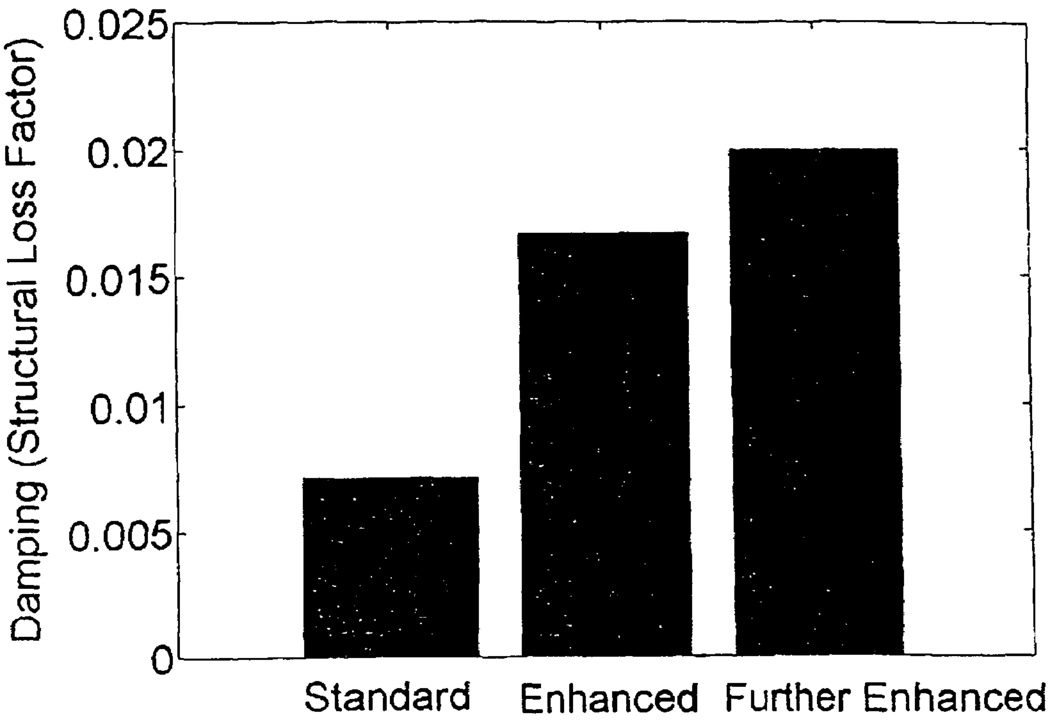
FIG. 3 shows a comparison of the structural loss factor for the present invention and standard damping coatings.

The range of coating thicknesses described above has been shown to provide a coating with both the desired damping properties and structural integrity. FIG. 3 of the accompanying drawings shows the structural loss factor observed under standard vibration damping tests performed on the material of the present invention where the level of damping to be expected falls into the regions indicated as "enhanced" or "further enhanced" depending on the compositions of the materials and the thicknesses of the outermost metallic layer and the ceramic vibration damping layer.

The present invention enables metallic articles to be provided with a vibration damping coating, such that the coated articles have improved resistance to foreign object damage and resistance to erosion, in comparison with articles provided with known vibration damping coatings.

This invention is considered likely to be of particular utility in relation to aerospace components at risk of foreign object damage and erosion, such as, by way of non limiting example, rotatable and non rotatable component parts of gas turbine engines at the air intake end of the engine.

The present invention has been broadly described without limitation. Variations and modifications as will be readily apparent to those skilled in this art are intended to be covered by the present application and resulting patents.

The invention claimed is:

1. A method of damping vibration and enhancing resistance to foreign object damage and/or erosion of a metallic article, said method comprising:

applying to a metallic article a vibration damping coating comprising ceramic and metallic components, the coating enhancing resistance to foreign object damage and/or erosion, while substantially maintaining or enhancing vibration damping performance of the coating, thereby substantially maintaining or enhancing vibration damping performance of the metallic article, wherein a predominant component of an outermost portion of the coating is metallic and the ceramic vibration damping coating comprises a spinel and the metallic article comprises a substrate including a titanium alloy.

2. A method according to claim 1, wherein the metallic outermost portion of the vibration damping coating is chosen from a list of materials comprising titanium alloys; steel alloys; nickel or any alloy or adduct consisting predominantly of nickel; and the spinel is a magnesia-alumina spinel.

3. A method according to claim 1, wherein the outermost metallic portion of the coating is substantially free of non-metallic intrusions or cavities.

4. A method according to claim 1, wherein the metal comprising the outermost portion of the vibration damping coating is the same as the metal of the article beneath the coating.

5. A method according to claim 1, wherein at least one of the interfaces between the article and the coating and between the outermost portion of the coating and the remainder of the coating is continuously graded.

6. A vibration-damped metallic article in which vibration is damped by the method according to claim 1.

7. A vibration-damped metallic article, comprising:

a substrate comprising a titanium alloy;

a vibration damping coating comprising ceramic and metallic components, wherein a predominant component of an outermost portion of the coating is metallic and is substantially free of non-metallic intrusions or cavities and the ceramic vibration damping coating comprises a spinel.

8. A vibration-damped metallic article according to claim 7, wherein the metallic outermost portion of the vibration damping coating is chosen from a list of materials comprising titanium alloys; steel alloys; nickel or any alloy or adduct consisting predominantly of nickel; and the spinel is a magnesia-alumina spinel.

9. A vibration-damped metallic article according to claim 7, wherein the metal comprising the said outermost portion of the vibration damping coating is the same as the metal of the article beneath the coating.

10. A vibration-damped metallic article according to claim 7, wherein at least one of the interfaces between the article and the coating and between the outermost portion of the coating and the remainder of the coating is continuously graded.

11. A vibration-damped article according to claim 7, wherein the coating consists essentially of one ceramic vibration damping layer and one metallic outermost layer, optionally graded at one or more of the interfaces between the layers and between the ceramic layer and the article.

12. A vibration-damped article according to claim 11, being a component of a gas turbine engine.

13. A component of a gas turbine engine as claimed in claim 12, wherein the component is an air intake fan blade of a gas turbine engine.

14. A component of a gas turbine engine as claimed in claim 12, wherein the outermost layer consists essentially of a titanium alloy.

15. A component of a gas turbine engine as claimed in claim 13, wherein the outermost layer consists essentially of a titanium alloy.

* * * * *